(12) United States Patent
McMullin et al.

(10) Patent No.: US 7,412,035 B2
(45) Date of Patent: Aug. 12, 2008

(54) EXTERNAL DETECTION OF OPTIONAL TELEPHONE SERVICES ON A TELEPHONE LINE

(75) Inventors: William P. McMullin, Bedford (CA); Liam Keast, Bedford (CA)

(73) Assignee: AOL LLC, a Delaware Limited Liability Company, Dulles, VA (US)

( * ) Notice: Subject to any disclaimer, the term of this patent is extended or adjusted under 35 U.S.C. 154(b) by 0 days.

(21) Appl. No.: 11/612,248

(22) Filed: Dec. 18, 2006

(65) Prior Publication Data

US 2007/0127628 A1 Jun. 7, 2007

Related U.S. Application Data

(63) Continuation of application No. 10/766,950, filed on Jan. 30, 2004, now Pat. No. 7,158,615, which is a continuation-in-part of application No. 10/721,749, filed on Nov. 26, 2003, now Pat. No. 6,950,498.

(60) Provisional application No. 60/509,274, filed on Oct. 8, 2003.

(51) Int. Cl.
*H04M 1/24* (2006.01)
*H04M 3/08* (2006.01)
*H04M 3/22* (2006.01)

(52) U.S. Cl. .................. 379/29.01; 379/15.03; 379/23; 379/27.02

(58) Field of Classification Search ................ 370/1.01, 370/15.01, 15.03, 22, 23, 26.01, 27.01, 27.02, 370/27.03, 29.01, 201.01, 201.02, 201.12, 370/252, 241.1, 259

See application file for complete search history.

(56) References Cited

U.S. PATENT DOCUMENTS

| | | | |
|---|---|---|---|
| 3,963,874 A | 6/1976 | Pommerening et al. | |
| 5,883,883 A | 3/1999 | Baker et al. | |
| 5,937,034 A | 8/1999 | Kennedy et al. | |
| 6,215,854 B1 | 4/2001 | Walance | |
| 6,381,310 B2 | 4/2002 | Furukawa et al. | |
| 6,633,549 B1 | 10/2003 | Fedane | |
| 6,950,498 B1 | 9/2005 | McMullin et al. | |
| 7,158,615 B1 * | 1/2007 | McMullin et al. | 379/29.01 |

* cited by examiner

*Primary Examiner*—Quoc D Tran
(74) *Attorney, Agent, or Firm*—Fish & Richardson P.C.

(57) ABSTRACT

Determining whether a call forward busy service is enabled on a telephone line includes placing a first test call across a network to the telephone line. First signaling data is received through the network in response to the first test call. The first signaling data is evaluated to determine whether the first test call is inspiring a ringing condition. A second test call is placed across the network conditioned on whether the first signaling data indicates that the first test call is determined to be inspiring a ringing condition. The second test call is placed while the first test call remains inspiring ringing. Second signaling data is received through the network in response to the second test call. A call forward busy service is concluded to be enabled on the telephone line based on whether the second test call is determined to be inspiring a ringing condition.

20 Claims, 4 Drawing Sheets

EXTERNAL DETECTION OF OPTIONAL TELEPHONE SERVICES ON A TELEPHONE LINE

CROSS REFERENCE TO RELATED APPLICATIONS

This application is a continuation of U.S. patent application Ser. No. 10/766,950, filed Jan. 30, 2004, now U.S. Pat. No. 7,158,615 now allowed, which is a continuation-in-part of U.S. patent application Ser. No. 10/721,749, filed Nov. 26, 2003, and titled EXTERNAL DETECTION OF OPTIONAL TELEPHONE SERVICES, now U.S. Pat. No. 6,950,498, issued Sep. 27, 2005, which claims priority from U.S. Provisional Application No. 60/509,274, filed Oct. 8, 2003, and titled EXTERNAL DETECTION OF OPTIONAL TELEPHONE SERVICES.

TECHNICAL FIELD

The disclosure relates to telephone services and voice services on a network.

BACKGROUND

Optional telephone services are features implemented by a switch in a telephone network such as, for example, a DMS-100 or a SONUS Soft Switch. Optional telephone services may include call forward busy, call forward no answer, and call waiting. Optional telephone services are distinguished from voice services, which are services related to the exchange of voice communications that are not implemented by a switch in the telephone network but rather are implemented by other systems within or communicatively coupled to the telephone network. Voice services may include voicemail and call alerts.

Voice services typically use optional telephone services such as call forward busy and call forward no answer to redirect calls across the telephone network to systems implementing the voice services.

DETAILED DESCRIPTION

Figure 1:
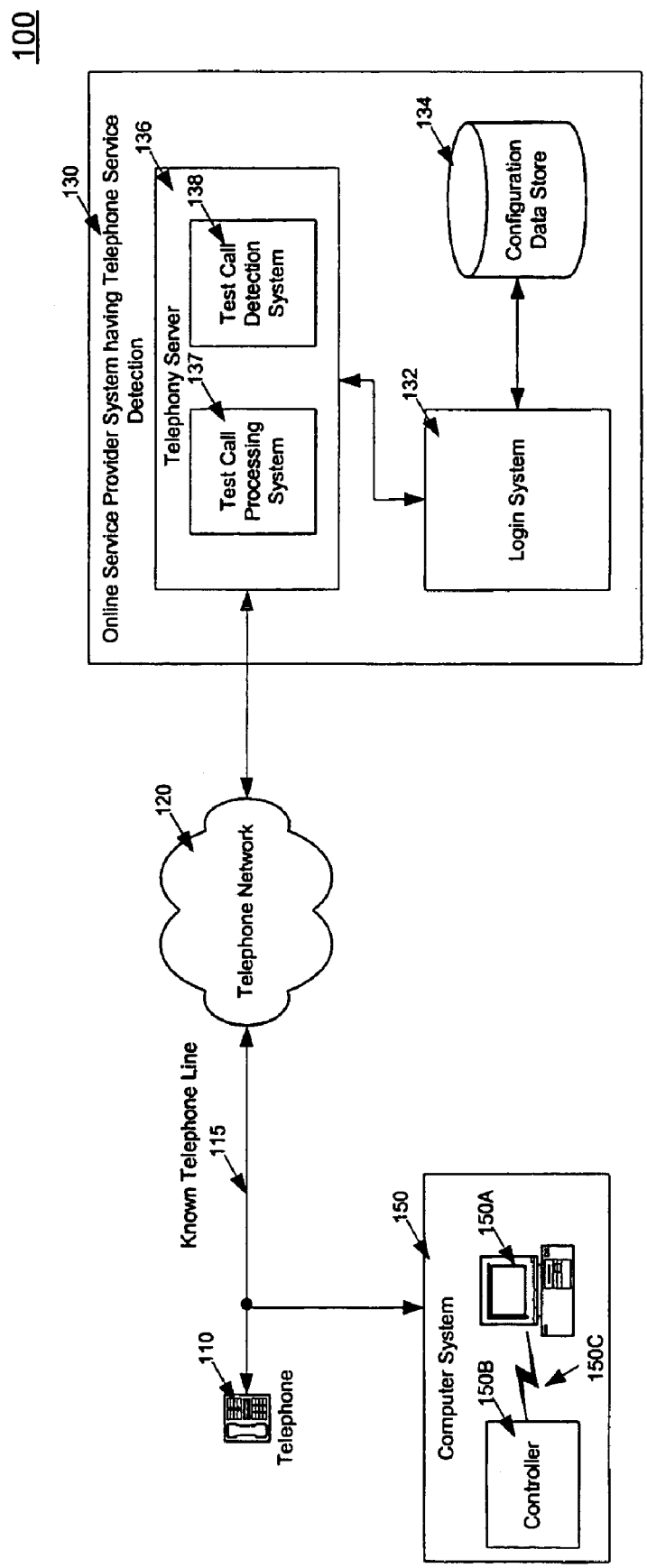
FIG. 1 is a block diagram of a system for externally detecting optional telephone services on a known telephone line.

Online service providers, which provide voice and/or data services to subscribers, frequently do not have access to information regarding which telephone services offered by telecommunications providers are actually enabled on a telephone line of a particular subscriber. Such information, however, may be useful to the online service provider seeking to offer, establish and/or to optimize the voice or data services available to the subscriber over the telephone line or otherwise.

For example, if an online service provider offers a voicemail service to a subscriber, the online service provider typically requires that the subscriber set up a call forward busy/no answer service that redirects calls to the online service provider system when the telephone line of the subscriber is busy or not answered. This call forward busy/no answer service, therefore, is setup by the telecommunications provider as a prerequisite to receiving the voicemail service from the online service provider. Accordingly, the online service provider may find it useful to test a subscriber's telephone line to verify that this call forward busy/no answer service has been setup prior to enabling the voicemail service. Such testing may speed up the life cycle of the service by enabling billing to commence immediately after the call forward busy/no answer service has been setup and also may be used when troubleshooting the voicemail service to ensure that service problems experienced by a subscriber are due to the voicemail system itself and not due to improper setup or call processing by the telephone network.

In another example, an online service provider that offers a dial-up Internet connection service to subscribers may find it useful to know whether the telecommunications provider of a subscriber has enabled a call waiting service on the telephone line of the subscriber. Moreover, because call waiting can create connection problems when enabled on a telephone line used to connect to the Internet, the online service provider may find it useful to detect whether a telephone line of a subscriber has a call waiting service enabled on it when the subscriber attempts to access the Internet using the telephone line. If the online service provider detects a call waiting service enabled on the telephone line, the online service provider system may disable the call waiting service temporarily while the telephone line is being used to connect to the Internet. The online service provider is thereby able to improve the experience of subscribers that have purchased dial-up Internet access service by preventing intermittent loss of connection.

The online service provider may externally detect optional telephone services enabled on a telephone line of a subscriber or potential subscriber by placing calls over the telephone network to a destination telephone and capturing responsive signaling information provided by the telephone network for each call. The signaling information includes information about the status of the telephone line of the destination telephone (e.g., ringing or busy) and may be used to impute information about the existence or lack of optional telephone services enabled on the telephone line of the destination phone. Generally, one or two test calls may be made to a telephone line of interest to identify the optional telephone services enabled on that telephone line. To minimize the impact on the telephone line and to enable desired results, the multiple calls are placed in a relatively short interval of time. For example, the multiple calls may be placed in two seconds or less, assuming a negligible telephone network delay of, for example, one second or less.

The optional telephone services that may be detected by the online service provider system depend on the type of telephone line being tested. Two types of telephone line are distinguished: (1) a telephone line associated with a subscriber registered to receive services from the online service provider over the telephone line (hereinafter referred to as a known telephone line); and (2) a telephone line not associated with a subscriber registered to receive services from the online service provider system over the telephone line (hereinafter referred to as an unknown telephone line).

The online service provider system may externally detect that a known telephone line has: (1) no optional telephone services enabled; (2) a call forward busy service enabled that forwards calls to the online service provider system and no call waiting service enabled; (3) a call forward busy service enabled that forwards calls to the online service provider system and a call waiting service enabled; (4) a call forward busy service enabled that does not forward calls to the online service provider system; or (5) a call waiting service enabled and no call forward busy service enabled.

The online service provider system also may externally detect that an unknown telephone line has a call forward busy service enabled. The ability to detect whether an unknown telephone line has a call forward busy service enabled is particularly useful in identifying potential customers that are currently receiving a voicemail service. Since a substantial majority of telephone lines that have a call forward busy service enabled are using the call forward busy service to forward calls to a voicemail system, an inference may be made that customers associated with the telephone line having a call forward busy service enabled are also receiving a voicemail service. Moreover, the online service provider may identify customers that are believed to be receiving a voicemail service by detecting whether their corresponding telephone lines have a call forward busy service enabled. The online service provider may use this information for marketing or other purposes. For example, the online service provider may offer customized voicemail service products to a subset of all customers that includes customers currently using a voicemail service from a competitor or that includes customers that do not currently use any voicemail service.

Referring to FIG. 1, a system 100 for externally detecting optional telephone services enabled on a known telephone line includes a telephone 110 that communicates over a known telephone line 115 across a telephone network 120 with an online service provider system having telephone service detection 130. The online service provider system 130 also may communicate across a network 140 with a computer system 150, which computer system 150 is associated with the telephone 110. The online service provider system 130 includes a login system 132, a configuration data store 134, and a telephony server 136.

The system 100 is configured such that the telephone 110 may receive calls over the known telephone line 115 and across the telephone network 120. As defined previously, the known telephone line 115 is known to the online service provider system 130 because a subscriber associated with the known telephone line 115 is registered to receive services from the online service provider system 130.

More specifically, in the FIG. 1 implementation, the telephone 110 may be, for example, a landline telephone that allows communications over the telephone network 120, or a wireless telephone such as a cellular telephone or a mobile personal digital assistant (PDA) with embedded cellular telephone technology.

The telephone network 120 is configured to enable direct or indirect voice communications between the telephone 110 and the telephony server 136 over the known telephone line 115. The telephone network 120 also is configured to provide call signaling data to the telephony server 136. The call signaling data includes data corresponding to a ringing signal or data corresponding to a busy and/or disconnect signal.

The telephone network 120 may include a circuit-switched voice network, a packet-switched data network, or any other network able to carry voice. For example, circuit-switched voice networks may include the Public Switched Telephone Network (PSTN), and packet-switched data networks may include networks based on the Internet protocol (IP) or asynchronous transfer mode (ATM), and may support voice using, for example, Voice-over-IP, Voice-over-ATM, or other comparable protocols used for voice data communications.

The online service provider system 130 is a computer system that is configured to provide one or more online services to subscribers and to detect optional telephone services enabled on the known telephone line 115. The online services may include voice services and data services. The voice services may include, for example, voicemail and call alerts. The data services may include, for example, Internet access, e-mail, and instant messaging. The user of the known telephone line 115 may receive voice and/or data services from the online service provider system 130.

The login system 132 controls user access to the voice and data services offered by the online service provider system 130. The login system 132 also determines when a telephone line of a subscriber is busy due to the telephone line being used to log into the online service provider system 130. If the login system 132 determines that a subscriber is using a telephone line to log into the online service provider system and that telephone line is known (i.e., the telephone line is associated with the subscriber), the login system 132 sends a test initiation message to the telephony server 136 instructing the telephony server 136 to begin placing test calls to the known telephone line to detect the optional telephone services enabled on the known telephone line.

For instance, in one implementation, a user of the computer system 150 attempts to access services by using the computer system 150 to dial into the online service provider system 130 over the known telephone line 115 and across the telephone network 120. The call is terminated at the telephony server 136. The user inputs a password and a user identifier which are received by the telephony server 136. The telephony server 136 also receives or otherwise accesses caller-related information from the telephone network 120 including the direct number of the telephone line used to connect to the telephony server 136. In this example, the telephony server 136 receives the direct number of the known telephone line 115. The telephony server 136 sends the password, caller-related information, and the user identifier to the login system 132.

The login system 132 determines whether to provide a user with access to services by comparing the offered user password and corresponding user identifier to that stored in the configuration or registration data store 134. If the offered password is the password stored in the configuration data store 134 corresponding to the received user identifier, then the login system 132 permits the user to login since the user is registered to receive services from the online service provider. Once logged in, the user may access services including, for example, Internet access, e-mail, or voicemail using the computer system 150.

The login system 132 also determines whether the direct number of the telephone line used to connect to the telephony server 136 corresponds to the telephone line associated with the user identifier in the configuration data store 134. If the telephone line used to connect to the telephony server 136 is the same as that associated with the user identifier (i.e., the telephone line is known), then the login system 132 sends a test initiation message to the telephony server 136. The test initiation message indicates that the telephone line used to log into the online service provider system is known to be associated with the subscriber and is known to be currently occupied by the dial-up connection used to log into the online service provider system 130. Upon receiving the test initiation message, the telephony server 136 may test the telephone line for optional telephone services.

In another implementation, a user of the telephone 110 calls the telephony server 136 to check voicemail or to receive voice services over the telephone 110. The telephony server 136 receives caller-related information from the telephone network 120 including the direct number of the telephone line used to call the telephony server 136. The telephony server 136 sends the caller-related information to the login system 132.

The login system 132 accesses the configuration data store 134 to determine whether the caller-related information corresponds to a caller that is registered to receive voice services. If the caller-related information does not correspond to a caller registered to receive voice services, the login system 132 sends a caller-not-recognized response to the telephony server 136 which prompts the caller to input a user identifier and a password. If the caller-related information corresponds to a caller registered to receive voice services, the login system 132 sends a caller-recognized response to the telephony server 136 which prompts the caller to input a password (i.e., a user identifier is not necessary in this case since the caller-related information is assumed to identify the caller).

The login system 132 compares the offered password and user identifier/captured caller-related information to that stored in the configuration data store 134 to determine whether or not to grant the caller access to services. If the offered password is the password stored in the configuration data store 134 corresponding to the received user identifier/caller-related information, then the login system 132 permits the caller to login. If a caller is permitted to login and the direct number of the phone line used to connect to the telephony server 136 is the same as that associated with the received password in the configuration data store 134 (i.e., the phone line is known), the login system 132 sends a test initiation message to the telephony server 136. The test initiation message indicates that the telephone line is known to be currently occupied by the caller calling into the online service provider system 130, and, accordingly, the telephone line may now be tested for optional telephone services in accordance with process 200 discussed below.

In yet another implementation related to the previously described implementation, if the direct number of the phone line used to connect to the telephony server 136 is not the same as that associated with the received password and user identifier in the configuration data store 134 (i.e., the phone line is unknown), the login system 132 may send a message to the telephony server 136 to test the unknown phone line in accordance with operations 402-412 of process 400 discussed below. In this manner, the online service provider may determine and store statistical service information about any phone lines, whether known or unknown, that are used to access or otherwise call into the telephony server 136.

The configuration data store 134 is a data storage device that stores service-related information (e.g., types of services received and preferences selected for each service), customer-related information (e.g., name, address, and telephone number), user identifiers, passwords, and login status. The configuration data store 334 may store this information in data records that are indexed by user identifier, password, or telephone number. In some implementations, this information is stored in multiple different data stores accessible to the login system 132 and to the telephony server 136.

The telephony server 136 is a computer system configured to communicate with the telephone network 120 to detect the optional telephone services offered on the known telephone line 115. The telephony server 136 receives calls from the telephone 110 and/or computer system 150 across the telephone network 120 and communicates with the login system 132 to determine whether to provide a caller or user with access to services offered by the online service provider system 130.

The telephony server 136 includes a test call processing system 137 and a test call detection system 138. The test call processing system 137 places one or more test calls directed to the known telephone line 115 in response to receipt of a test initiation message from the login system 132, receives corresponding signaling data from the telephone network 120, and receives communications from the test call detection system 138 indicating whether or not the test call was redirected back to the telephony server 136 by the telephone network 120. The test call processing system 137 imputes the optional telephone services currently available on the known telephone line 115 based on the received signaling data from the telephone network 120 and based on whether the test call was redirected back to the telephony server 136. The test call processing system 137 may use, for example, Integrated Services Digital Network signaling to place the calls to the known telephone line 115.

The test call detection system 138 receives a test call that is redirected back to the telephony server 136, responds to the redirected test call by indicating to the telephone network 120 that the line to which the test call has been redirected is busy, and sends a communication to the test call processing system 137 indicating that the test call has been redirected back to the telephony server 136. In another implementation, the test call detection system 138 is part of a voice service system (e.g., a voicemail or call alerts system) internal or external to the online service provider system 130. The test call detection system 138 may use, for example, Integrated Services Digital Network signaling to respond to the calls from the telephone network 120.

The computer system 150 is configured to receive data services from the online service provider system 130. The call destination computer system includes a device 150A capable of executing instructions under the command of a controller 150B. The device 150A may be a general purpose computer, such as a workstation or a personal computer, a PDA, a special purpose computer, an intelligent mobile phone, a pager, or a set top box.

The controller 150B commands and directs communications between the device 150A of the call destination computer system 150 and the online service provider system 130. The controller 150B may include one or more software or hardware applications that enable digital communications to be received from or exchanged with the online service provider system 130. For example, the controller 150B may be client software configured to enable a user to log into the online service provider system 130 to receive data services. The client software may be, for example, an instant messaging application, a call alerts application, a browser application, or an e-mail application. The device 150A is connected to the controller 150B by a wired, wireless or virtual (i.e., when the controller is software running on the device) data pathway 150C capable of delivering data.

Figure 2:
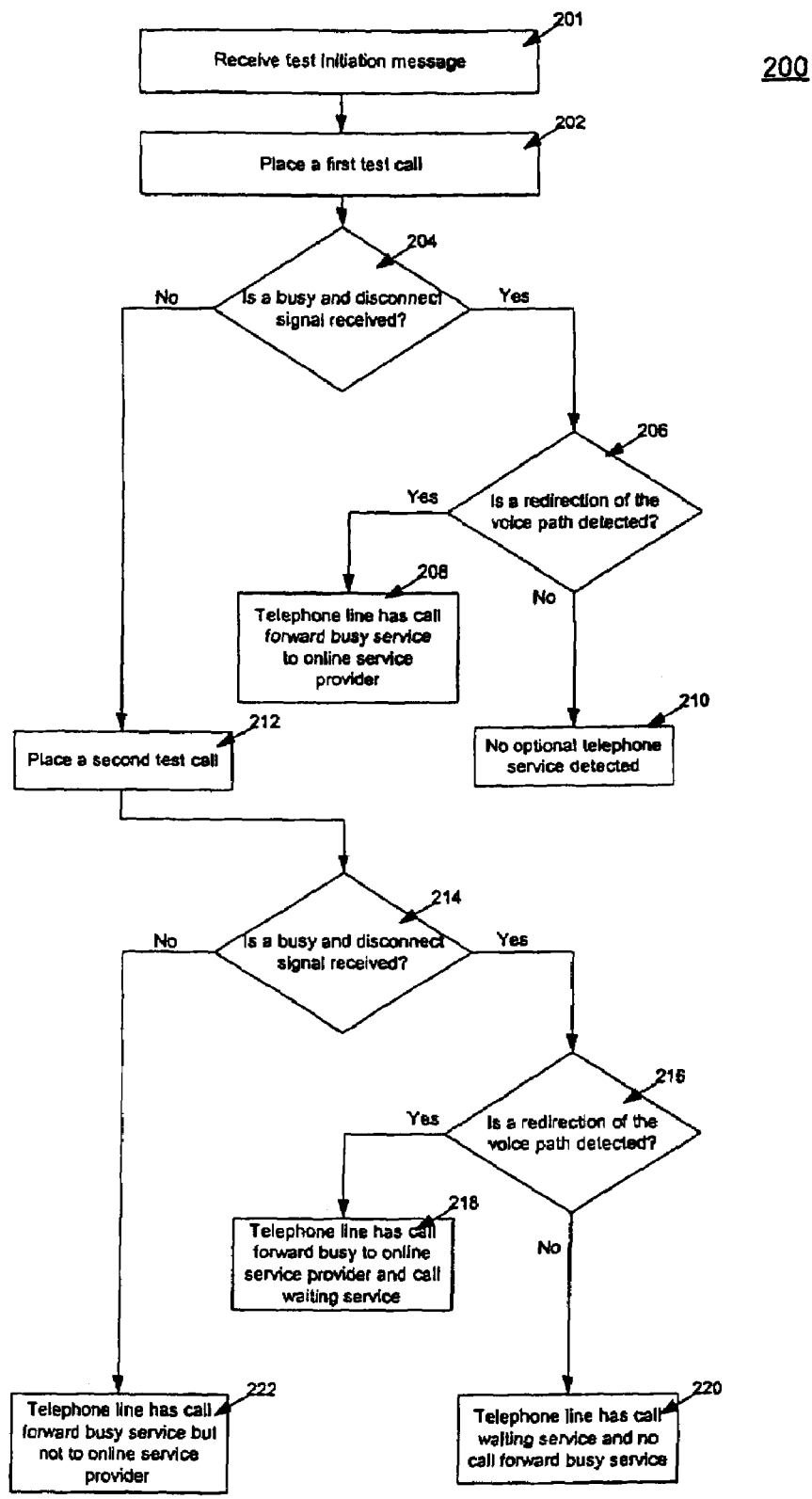
FIG. 2 is a flow chart of a process for externally detecting optional telephone services on a known telephone line.

FIG. 2 shows a process 200 for externally detecting optional telephone services on a known telephone line. The process 200 may be implemented, for example, by the telephony server 136. The process 200 typically is implemented in response to receiving a test initiation message from the login system 132 informing the telephony server 136 that the known telephone line 115 is currently occupied.

In the process illustrated by FIG. 2, the test call processing system 137 of the telephony server 136 receives a test initiation message from the login system 132 (201). The test call processing system 137 places a first test call to the direct number of the known telephone line 115 (202) and determines whether a busy and disconnect signal is received from the telephone network 120 in response to the first test call (204). The test call processing system 137 also determines whether the call has been redirected or forwarded back to the telephony server 136 by the telephone network 120 based on whether a communication is received from the test call detection system 138 (206). If a busy and disconnect signal is received and a redirection of the voice path back to the online service provider system 130 has occurred, the known telephone line 115 is deemed to have a call forward busy service enabled that forwards calls to the online service provider system 130 (208). The forwarded calls back to the online service provider system 130 are detected by the test call detection system 138, which responds to the telephone network 120 by indicating that the line is busy while also sending a communication to the call processing system 137 indicating that the voice path has been redirected back to the online service provider system 130. Accordingly, the call processing system 137 receives a busy and disconnect signal from the telephone network 120 and a communication from the test call detection system 138 indicating that the call was forwarded back to the online service provider system 130.

If a busy and disconnect signal is received and a redirection of the voice path back to the online service provider system 130 has not occurred, the telephone line 115 is deemed to have no optional telephone services enabled (210). The call processing system 137 imputes that no optional telephone services are enabled on the known telephone line 115 because the known telephone line 115 is occupied by the call recipient and one additional telephone call directed to the known telephone line 115 results in a busy signal. Accordingly, the known telephone line 115 does not have a call forwarding or a call waiting service enabled since, if such a service were enabled, the call processing system 137 would not receive a busy signal in response to the first test call or, if such a busy signal were received, would additionally receive a communication from the test call detection system 138 indicating that the call was forwarded back to the online service provider system 130.

If a busy and disconnect signal is not received (i.e., an alert or connect signal is received instead), the call processing system 137 places a second test call to the direct number of the known telephone line 115 (212), before the first test call is disconnected.

The call processing system 137 determines whether a busy and disconnect signal is received from the telephone network 120 in response to the second test call (214). The call processing system 137 also determines whether the second test call has been redirected or forwarded back to the telephony server 136 by the telephone network 120 based on whether a communication is received from the test call detection system 138 (216).

If a busy and disconnect signal is received and a redirection of the voice path has occurred, the known telephone line 115 is deemed to have a call waiting service enabled and also a call forward busy service enabled that forwards calls to the online service provider system 130 (218). If a busy and disconnect signal is received and a redirection of the voice path has not occurred, the known telephone line 115 is deemed to have a call waiting service enabled and but no call forward busy service enabled (220). The call processing system 137 imputes that only a call waiting service is enabled on the known telephone line 115 because the known telephone line 115 is occupied by the call recipient, the first test call is being handled through call waiting, and the second test call results in a busy signal. Accordingly, the known telephone line 115 has call waiting but does not have call forwarding since, if such a service were enabled, the call processing system 137 would not receive a busy signal in response to the second test call or, if such a busy signal were received, would additionally receive a communication from the test call detection system 138 indicating that the second test call was forwarded back to the online service provider system 130.

If a busy and disconnect signal is not received, the known telephone line 115 is deemed to have a call forward busy service that does not forward calls to the online service provider system 130 (222). The call processing system 137 imputes that a call forwarding service is enabled on the known telephone line 115 because the known telephone line 115 is occupied by the call recipient, the first test call did not result in a busy signal, and the second test call did not result in a busy signal. Accordingly, the known telephone line 115 has call forwarding and may or may not additionally have call waiting.

For example, a subscriber receives dial-up Internet access from the online service provider and has a call waiting service and a call forwarding service enabled on his or her telephone line. The call forwarding service is setup to forward calls to the online service provider system 130 to receive a voicemail service offered by the online service provider. The subscriber logs into the online service provider system 130 using the computer system 150 by dialing into the online service provider system 130 over the known telephone line 115. The login system 132 enables the subscriber to login to get Internet access, determines that the subscriber is logging in using the known telephone line 115 (thereby occupying the known telephone line), and sends a test initiation message to the call processing system 137. The call processing system 137 receives the test initiation message (201) and places a first test call (202). Because the known telephone line 115 has call waiting service, a busy and disconnect signal is not received (204). The telephony server 136 places a second test call (212). Because the known telephone line 115 has call forwarding service to the online service provider system 130 and the online service provider system 130 is configured to detect but not answer incoming calls and to signal a busy line to a caller, a busy and disconnect signal is received by the call processing system 137 (214), and a communication is received from the test call detection system 138 indicating that the call was forwarded to the online service provider system 130 (216). Accordingly, the call processing system 137 determines that the known telephone line 115 has a call forward busy service to the online service provider system 130 enabled and a call waiting service enabled (218).

If a call forward busy service is detected on the known telephone line 115, the second test call is typically redirected to a voicemail, call alerts, or similar service. If the voicemail or call alerts service is provided by the online service provider system 130, the telephony server 136 may employ process 200 to determine whether the telephone network 120 has properly set up the call forward busy service required to enable operation of the voicemail or call alerts service.

The ability to externally detect optional telephone services on a telephone line also may be used by the online service provider 130 to improve the connectivity of dial-up users that have a call-waiting service enabled on their telephone line. Call waiting frequently interferes with a dial-up connection, so disabling call waiting when a user of the known computer system 150 logs into the online service provider system 130 using a dial-up connection is desirable.

In one implementation, a login system of the online service provider 130 detects when a user logs into the online service provider system 130 using a dial-up connection, captures the caller-related information used to login, and sends the caller-related information to the telephony server 136. The telephony server 136 receives the caller-related information and then calls the telephone line 115 using the direct number in accordance with process 200. If a call waiting service is enabled on the telephone line 115, the telephony server 136, may disable call waiting automatically without user input, or it may send a notification message to the computer system (e.g., the computer system 150) used to log into the online computer system 130 that informs the user through use of, for example, a dialog box that call waiting has been detected on the computer system and that the user may disable call waiting by, for example, selecting a corresponding option in the dialog box.

If the user of the computer system chooses to disable call waiting, then the communications software of the computer system is modified to add a predetermined number as a prefix to the number used to dial into the online service provider system 130. When dialing into the online service provider system 130, the predetermined number is dialed automatically and temporarily disables call waiting for the duration of each dial-up session.

Figure 3:
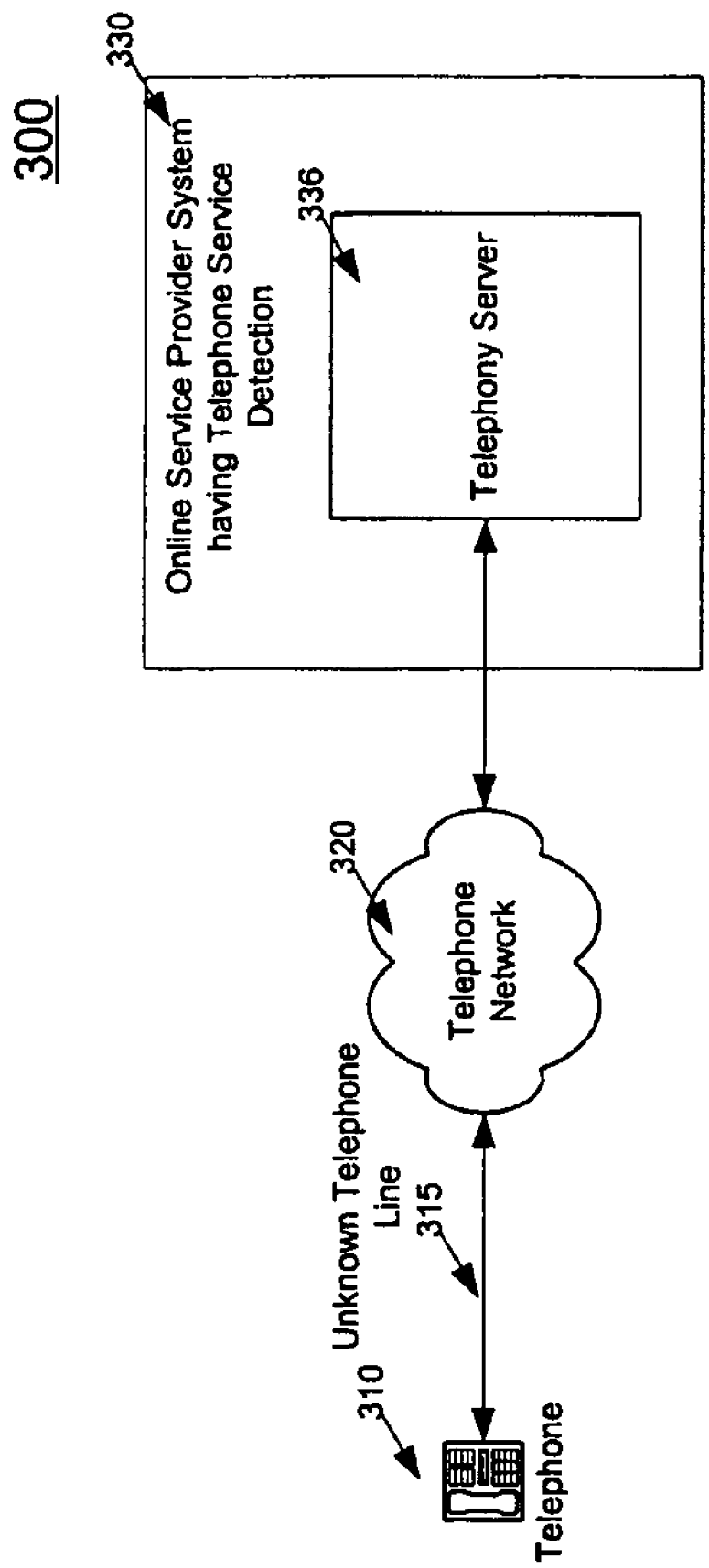
FIG. 3 is a block diagram of a system for externally detecting optional telephone services on an unknown telephone line.

Referring to FIG. 3, a system 300 is illustrated for externally detecting optional telephone services enabled on an unknown telephone line 315. The system 300 generally includes a telephone 310 that communicates over an unknown telephone line 315 and across a telephone network 320 with an online service provider system having telephone service detection 330. The online service provider system 330 includes a telephony server 336 configured to send calls to the telephone 310 and receive signaling information from the telephone network 320.

The telephone 310, the telephone network 320, and the online service provider system 330 have attributes similar to the telephone 110, the telephone network 120, and the online service provider system 130 of FIG. 1. However, the user of the telephone 310 does not receive services from the online service provider system 330 over their telephone line 315. In some implementations, the online service provider system 330 does not include a login system or a configuration or registration data store.

In yet another implementation, the online service provider system 330 is replaced by a telephone detection system that is not configured to offer any online services but rather simply detects the optional telephone services on an unknown telephone line 315. In such an implementation, the telephone detection system may be configured to enable other computer systems communicatively coupled to the telephone detection system (e.g., a telecommunications service provider or an online services provider) to access the detected telephone service information, for purposes of marketing or providing online services or otherwise.

The telephony server 336 is a computer system configured to communicate with the telephone network 320 to detect the optional telephone services offered on the unknown telephone line 115. The telephony server 336 places one or two calls directed to the unknown telephone line 315, receives corresponding signaling data from the telephone network 320, and imputes the optional telephone services enabled on the unknown telephone line 315 based on the received signaling data.

Figure 4:
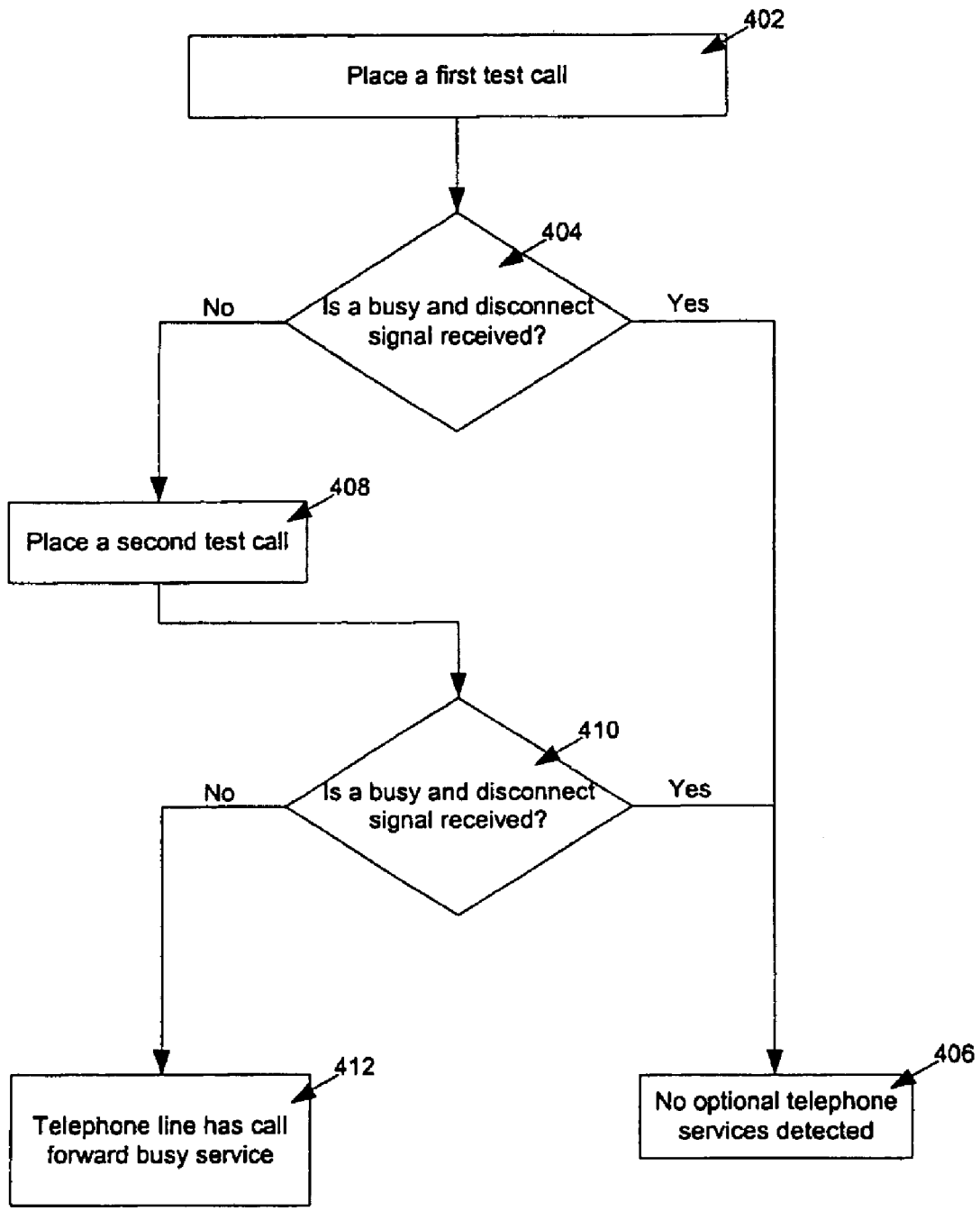
FIG. 4 is a flow chart of a process for externally detecting optional telephone services on an unknown telephone line.

FIG. 4 shows a process 400 for externally detecting optional telephone services on an unknown telephone line. The process 400 may be implemented, for example, by the telephony server 336. Unlike process 200 which is implemented upon receiving a test initiation message from the login system 132 indicating that the telephone line 115 is occupied, process 400 is implemented irrespective of the status of the telephone line 315 (i.e., irrespective of whether the line is occupied or not occupied). The telephony server 336 places a first test call to the telephone 310 over the telephone line 315 (402). The telephony server 336 determines whether a busy and disconnect signal is received from the telephone network 320 in response to the first test call (404).

If a busy and disconnect signal is received (404), no optional telephone services are detected on the unknown telephone line 315 (406). If a busy and disconnect signal is not received (i.e., a ringing and connect signal is received instead), the telephony server 136 places a second test call to the same direct number as the first test call (408), with the first test call remaining connected when the second test call is made.

The telephony server 336 determines whether a busy and disconnect signal is received from the telephone network 320 in response to the second test call (410). If a busy and disconnect signal is not received, the unknown telephone line 315 is deemed to have a call forward busy service enabled (412). The unknown telephone line 315 may or may not additionally have a call waiting service enabled. If a busy and disconnect signal is received, no optional telephone services are detected on the unknown telephone line 315 (406).

Once the optional telephone services have been detected, the one or two test calls are disconnected. The telephony server 336 may store the detected optional telephone services in a record in a data store (not shown) corresponding to the direct number of the unknown telephone line 315.

In applying the above processes to draw conclusions regarding the existence or lack of optional telephone services, several assumptions are generally made regarding the characteristics of the call waiting and call forward busy services. For instance, the call waiting service is assumed capable of concurrently placing a single incoming call on hold and not be capable of concurrently placing multiple calls on hold. The call forward busy/no answer service is assumed able to forward calls to a telephone number that can maintain multiple call connections simultaneously such as, for example, a telephone number corresponding to a voicemail system or to a call alerts system. In other words, the call forward busy/no answer service that is detected by the online service provider system is not a call forward busy/no answer service that forwards a call to, for example, a second telephone such as, for example, a cell phone that is only able to handle a single connection at a time. However, these concepts and approaches may be applied to unknown environments under the operating principals that most scenarios encountered will emulate the aforementioned assumptions, Furthermore, applying the concepts described above, other processes also may be devised or inspired to address difficult assumptions or to test for different optional telephone services.

A number of implementations have been described. Nevertheless, it will be understood that various modifications may be made. For example, the telephone 110 and the computer system 150 may be a single integrated system configured to receive calls over the known telephone line 115 and to receive voice services and/or data services from the online service provider system 130. The functions of two or more of the various systems described may be integrated into a single system that performs all of the functions. Similar concepts as those described in the above process 400 may be used to detect whether an unknown telephone line has other services or options enabled, such as a call waiting service, in addition or alternative to those described above.

What is claimed is:

1. A method comprising:
   placing a preliminary test call to a telephone line over a network;
   in response to the preliminary test call, receiving first signaling data through the network;
   evaluating the first signaling data to determine whether a busy or disconnect signal is received from the network in response to the preliminary test call;

if it is determined that the busy or disconnect signal is not received in response to the preliminary test call, placing a follow-up test call to the telephone line, the follow-up test call being placed while the preliminary test call remains connected;

in response to the follow-up test call, receiving second signaling data though the network;

evaluating the second signaling data to determine whether a busy or disconnect signal is received from the network in response to the follow-up test call; and if it is determined that the busy or disconnect signal is not received in response to the follow-up test call, concluding that the telephone line has an optional telephone service enabled.

2. The method of claim 1 further comprising concluding that the telephone line has no optional telephone service enabled, if it is determined that the busy or disconnect signal is received in response to the preliminary test call.

3. The method of claim 1 further comprising concluding that the telephone line has no optional telephone service enabled, if it is determined that the busy or disconnect signal is received in response to the follow-up test call.

4. The method of claim 1 wherein placing the preliminary test call includes placing the preliminary test call from an online service provider.

5. The method of claim 4 wherein the telephone line is not associated with a subscriber registered to receive services from the online service provider over the network.

6. The method of claim 4 wherein telephone line is associated with a subscriber registered to receive services from the online service provider over the network.

7. The method of claim 1 wherein placing the follow-up call includes placing the follow-up call while the first test call is inspiring a ringing condition.

8. The method of claim 1 wherein duration of the preliminary test call and duration of the follow-up test call are such that a ringing condition is not inspired for more than 2 seconds when negligible delay is introduced by the network.

9. The method of claim 1 wherein the preliminary test call is inspiring a ringing condition for less than 2 seconds when negligible delay is introduced by the network.

10. The method of claim 9 wherein the preliminary test call and the follow-up test call are simultaneously inspiring ringing condition for less than 2 seconds when negligible delay is introduced by the network.

11. A computer system comprising:
a telephony server configured to:
place a preliminary test call to a telephone line over a network;
in response to the preliminary test call, receive first signaling data through the network;
evaluate the first signaling data to determine whether a busy or disconnect signal is received from the network in response to the preliminary test call;
if it is determined that the busy or disconnect signal is not received in response to the preliminary test call, place a follow-up test call to the telephone line, the follow-up test call being placed while the preliminary test call remains connected;
in response to the follow-up test call, receive second signaling data through the network;
evaluate the second signaling data to determine whether a busy or disconnect signal is received from the network in response to the follow-up test call; and
if it is determined that the busy or disconnect signal is not received in response to the follow-up test call, conclude that the telephone line has an optional telephone service enabled.

12. The computer system of claim 11 wherein the telephony server is further configured to conclude that the telephone line has no optional telephone service enabled, if it is determined that the busy or disconnect signal is received in response to the preliminary test call.

13. The computer system of claim 11 wherein the telephony server is further configured to conclude that the telephone line has no optional telephone service enabled, if it is determined that the busy or disconnect signal is received in response to the follow-up test call.

14. The computer system of claim 11 wherein the telephony server is configured to place the preliminary test call by placing the preliminary test call from an online service provider.

15. The computer system of claim 14 wherein the line is not associated with a subscriber registered to receive services from the online service provider over the network.

16. The computer system of claim 14 wherein the telephone line is associated with a subscriber registered to receive services from the online service provider over the network.

17. The computer system of claim 11 wherein the telephony server is configured to place the follow-up call by placing the follow-up call while the first test call is inspiring a ringing condition.

18. The computer system of claim 11 wherein duration of the preliminary test call and duration of the follow-up test call are such that a ringing condition is not inspired for more than 2 seconds when negligible delay is introduced by the network.

19. The computer system of claim 11 wherein the preliminary test call is inspiring a ringing condition for less than 2 seconds when negligible delay is introduced by the network.

20. The computer system of claim 19 wherein the preliminary test call and the follow-up test call are simultaneously inspiring ringing condition for less than 2 seconds when negligible delay is introduced by the network.

* * * * *